United States Patent Office 3,755,430
Patented Aug. 28, 1973

3,755,430
PROCESS FOR THE PRODUCTION OF
METHALLYL SULFONATE
Gunter Lorenz, Heinrich Rinkler, and Gunther Nischk, Dormagen, Germany, assignors to Bayer Aktiengesellschaft, Leverkusen, Germany
No Drawing. Filed Oct. 9, 1969, Ser. No. 865,206
Claims priority, application Germany, Oct. 19, 1968,
P 18 04 135.5
Int. Cl. C07c *143/16*
U.S. Cl. 260—513 B           4 Claims

ABSTRACT OF THE DISCLOSURE

Process for the production of methallyl sulfonate by reacting a concentrated aqueous solution of sodium sulfite with at least a 5% molar excess of methallyl chloride in the presence of an emulsifier and recovering the product by cooling the reaction mixture to a temperature of 0–15° C.

---

The present invention relates to an improved process for the production of the sodium salt of methallyl sulfonic acid in an especially pure form.

Unsaturated sulfonic acids are important monomers for copolymerisation with other olefinically unsaturated compounds, and especially with acrylonitrile. They impart to these polymers good dyeability with basic dyes. Methallyl sulfonic acid in the form of its salts has proved to be particularly suitable for this purpose.

The preparation of the compound is already known. It is carried out according to the instructions given in U.S. patent specification 2,601,256 by heating of mixtures of methallyl chloride, sodium sulfite, water and alcohol for at least 10 hours, evaporating the reaction mixture to dryness and recrystallising the dry salt mixture from ethanol, the sodium chloride formed remaining behind undissolved.

A disadvantage of this process is that the presence of ethanol in the reaction mixture considerably increases the time required for the reaction because sodium sulfite is insoluble in ethanol and it is only sparingly soluble even in aqueous ethanol. In addition, it has been found by experience that the process of purification provides only a small yield because the methallyl sulfonate is only sparingly soluble in alcohol. Extraction has to be carried out at least four times to provide a sufficient quantity of sulfonate. This process is, therefore, uneconomical.

It is an object of this invention to provide a process for the production of methallyl sulfonate that avoids the difficulties mentioned above.

It is another object of this invention to provide a process for the production of methallyl sulfonate by which this compound is produced in a very pure form by an extremely economic process.

These objects are accomplished by a process for the production of sodium methallyl sulfonate which comprises reacting a concentrated aqueous solution of sodium sulfite with at least a 5% molar excess of methallyl chloride, said reacting being carried out in the presence of an emulsifier and in a first stage at a temperature of between 30 and 70° C. and thereafter under reflux conditions, and cooling the reaction mixture thus obtained to a temperature of 0 to 15° C. and collecting the crystals precipitated.

In this process, the solution of the sodium sulfite should be at a temperature of between about 30 and 70° C. The methallyl chloride is added slowly. The mixture is then heated under reflux for some time to complete the reaction. The excess of methallyl chloride is usually between 5 and 100 mols percent and preferably between 5 and 30 mols percent, based on the equivalent quantity.

Very short reaction times are required if the reaction is carried out in the presence of an emulsifier. Suitable emulsifiers are any compounds which are capable of forming an oil-in-water emulsion, and it is preferable to use long chain alkyl sulfonates, alkylaryl sulfonates, (subst.) naphthalene sulfonates and fatty alcohol sulfates.

These substances are used in quantities of 0.2 to 3.0%, preferably 0.5 to 1.0%, based on the quantity of methallyl chloride used, and they give rise to a very rapid reaction due to the great increase in the phase boundary surface area.

This provides for a very economical process. Complete reaction is achieved after only 1 to 2½ hours, and better utilisation of the chemicals employed, and the reaction apparatus, is achieved than by the methods hitherto known.

In detail, the reaction by the process according to the invention is carried out as follows: Commercial sodium sulfite (anhydrous $Na_2SO_3$) is introduced into 1.8 to 2.6 times the quantity of water, the given quantity of emulsifier is added, and the reaction mixture is heated. The above mentioned excess quantity of methallyl chloride is added and the mixture is heated under vigorous reflux with stirring for 1 to 2½ hours and the excess methallyl chloride is then distilled off.

The methallyl chloride recovered can be used again. The hot solution is stirred with active charcoal for decolorisation and clarification, and is filtered under suction. An aqueous solution of sulfonate and sodium chloride is obtained in the filtrate. The object of the subsequent steps of the process is to separate these products by the simplest and most economical method.

As already mentioned above, the repeated extraction of the evaporation residue of this solution with ethanol is an uneconomical method. The method of partial precipitations, followed by recrystallisations from 85% ethanol described in DDR patent specification 41,968 is also unsatisfactory because the quantities of solvent required are large, and the water content has to be accurately maintained if losses in yield and too high a chloride content in the product are to be avoided.

The reaction products obtained in accordance with this invention can be worked up by cooling the aqueous solution of sodium methallyl sulfonate and sodium chloride to temperatures of 0 to +15° C. and squeezing the precipitated crystals to a residual moisture content of at the most 16% by weight of water, under pressure or by centrifuging in a filter centrifuge. If these conditions are met, the first fraction obtained is a completely colorless product, which, after drying, is obtained in a yield of 40 to 50% of the theoretical, and has a chloride content of at the most 1.2%. No further recrystallisation is necessary.

The mother liquor from the first crystalline fraction can then be evaporated to dryness in vacuo. No decomposition of the product occurs under these mild conditions.

The dried and broken up salt mixture can then be extracted lower aliphatic carboxylic acids or their N,N-dialkyl substituted amides, the temperature employed depending on the solubility of the sulfonate in the solvent used.

The following are mentioned as solvents: Formic acid, acetic acid, propionic acid, N,N-dimethylformamide and N,N-diethylacetamide. The following are preferred: Formic acid, acetic acid and N,N-dimethylformamide.

Surprisingly, methallyl sulfonate dissolves very readily in formic acid, even at room temperature 1 part of sulfonate dissolving in about 2.15 parts by weight of formic acid, whereas sodium chloride dissolves only in very small quantities under these conditions. The separation of methallyl sulfonate is, therefore, very simple, the dry salt mixture being stirred with the required quantity of formic acid at room temperature for some time, 1 to 2 hours being sufficient, and then filtered. If desired, the sodium chloride residue may be stirred again with a small quantity of fresh formic acid, the yield of sulfonate being found to be slightly increased thereby.

By evaporating the filtrate in vacuo, methallyl sulfonate is obtained as an almost colorless crystalline residue and formic acid is recovered. The yield of sulfonate is 35 to 45% of the theory, the total yield being thus 75 to 85% of the theory.

The product has a chloride content of about 1 to 2%, and, at the same time, decomposition of the formic acid is avoided by operating at room temperature. The sulfonate may also be precipitated from the acid using a material in which it is insoluble, for example by the addition of acetone, if necessary after first concentrating the solution in vacuo. The product then obtained is pure white but the yield is slightly smaller.

Higher temperatures are required if acetic acid, propionic acid or the above mentioned amides are used because methallyl sulfonate is only slightly or moderately soluble in these solvents at room temperature. The procedure preferably consists of boiling the dry salt mixture with about 3 to 6 times the quantity of one of the said solvents, based on the methallyl sulfonate content, and filtering hot from the sodium chloride with suction. Methallyl sulfonate then crystallises as the filtrate cools. After removal of the crystals, it is preferable to extract the residue which contains sodium chloride again with the mother liquor employing heating, to remove the methallyl sulfonate completely. A further portion of methallyl sulfonate then crystallises on cooling. The yield of these two fractions together amount to 20 to 25% of the theory. The product is very pure and the chloride content is between 0 and 1%. With the quantity of sodium methallyl sulfonate separated from the reaction solution on cooling, the total yield of pure product is 65 to 75% of the theory.

On evaporation of the mother liquor to recover the solvent, about 10 to 14% of the theoretical amount of a slightly brownish colored sulfonate which contains only 2 to 3% of chloride, remains behind as residue, which is preferably added to the next batch together with the active charcoal. The total yield is thus approximately 80 to 85% of the theory.

The solvents used for recrystallisation or extraction of methallyl sulfonate should preferably have a low water content in order to keep the chloride content of the product low, but small quantities of water do not matter because the solubility of sodium chloride in the said solvents at first increases only very slowly with increasing water content. Thus, for example, when formic acid is used, the commercial 85 to 90% acid may be used because only a small amount of solvent is then required and the commercial acid can be obtained very cheaply. Under conditions which are otherwise the same, a product which has a chloride content of about 3% is obtained, a quantity which in no way interferes with the polymerisation.

EXAMPLE 1

126 parts by weight of commercial sodium sulfite and 1 part by weight of di-sec.-butyl naphthalene sulfonate are introduced into 260 parts by volume of water and heated to 60 to 70° C. 120 parts by weight of methallyl chloride are slowly run in and the mixture is then stirred under vigorous reflux for 2 hours. The excess methallyl chloride is distilled off and approximately 35 parts by weight of aqueous distillate are obtained which can be used again.

The solution which remains behind is heated to 90° C. after the addition of 3 parts by weight of active charcoal and is then filtered. After cooling to 10 to 15° C., the crystals which separate out are removed by suction filtration and freed from the mother liquor by squeezing. 81.7 parts by weight of moist sodium methallyl sulfonate are obtained which after drying yield 69.5 parts by weight=44% of the theory. The chloride content is 0.9%. Melting point of the crystals 245 to 250° C.

The mother liquor is concentrated by evaporation in vacuo, and the dried and broken up residue is thoroughly boiled with 200 parts by volume of glacial acetic acid and filtered hot. The crystals which separate out are removed from the cold filtrate by suction filtration and the mother liquor is used for again boiling up the residue which contains sodium chloride. The combined crystallisates of the last two fractions yield as a second crystalline fraction, after drying, 39 parts by weight=25% of the theory of methallyl sulfonate with a chloride content of 0.1%.

The remaining mother liquor is concentrated by evaporation to recover the acetic acid, and approximately 20 parts by weight=12.7% of methallyl sulfonate which has a slight pale brown discoloration and a chloride content of about 3% are left behind as evaporation residue. This is preferably added to the next batch together with active charcoal.

EXAMPLE 2

The procedure is the same as in Example 1 and 68.0 parts by weight of sodium methallyl sulfonate=43% of the theory, with a chloride content of 1.0%, are obtained as first crystalline fraction.

The evaporation residue of the mother liquor is boiled once with 320 parts by volume of glacial acetic acid and filtered hot. 58.5 parts by weight of sulfonate=37% of the theory with a chloride content of 0.8% are isolated from the cooled solution as second fraction after the addition of 250 parts by volume of acetone.

On recovery of the solvent, 6.5 parts by weight of yellowish methallyl sulfonate=4.1% of theory, with a chloride content of 2.4%, are obtained as distillation residue. This is added to the next batch together with active charcoal as in Example 1.

EXAMPLE 3

A solution of methallyl sulfonate in water is prepared from 126 parts by weight of sodium sulfite, 1 part by weight of sodium dinaphthylmethane sulfonate, 270 parts by volume of water and 120 parts by weight of methallyl chloride as described in Example 1 and worked up. 78.4 parts by weight of moist methallyl sulfonate or 66.5% by weight=42% of the theory of dry methallyl sulfonate with a chloride content of 1.2% are obtained as first fraction by cooling the solution and pressure filtration. The evaporation residue of the mother liquor is boiled up with 300 parts by volume of commercial dimethylformamide and this operation is repeated with the mother liquor after isolation of the crystals. The crystallisates are combined and yield as second fraction 51 parts by weight=32.2% of the theory of methallyl sulfonate with a chloride content of 0.1%. On recovery of DMF distillation under reduced pressure, a residue of 10.5 parts by weight=7% of the theory of brownish methallyl sulfonate which has a chloride content of 1.9% is left behind.

EXAMPLE 4

The procedure is the same as in Example 1 and 65 parts by weight=41% of the theory of methallyl sulfonate with a chloride content of 0.8% are obtained as the first crystalline fraction.

The dried and ground up evaporation residue of the mother liquor is stirred for one hour at room temperature with 120 parts by volume of pure formic acid (approximately 98 to 99%) and then filtered with suction. The residue is again stirred up with 60 parts by volume of formic acid and filtered with suction. The combined filtrates are evaporated to dryness under vacuum. 54 parts by weight=34% of the theory of colorless methallyl sulfonate with a chloride content of 1.7% remain behind.

EXAMPLE 5

The procedure is the same as described in Example 4 but using commercial formic acid which has a concentration of 85%. 65 parts by weight=41% of methallyl sulfonate with a chloride content of 1.0% are obtained as first fraction. The formic acid solution is concentrated by evaporation under reduced pressure until it has a pasty consistency and is then treated with 200 parts by volume of acetone and filtered with suction. 74 parts by weight= 47.5% of the theory of methallyl sulfonate with a chloride content of 3.1% are obtained as second fraction after drying.

What we claim is:

1. A process for the production of sodium methallyl sulfonate which comprises reacting (1) an aqueous solution containing sodium sulfite and a quantity of water that is 1.8 to 2.6 times the quantity of sodium sulfite with (2) at least a 5% molar excess of methallyl chloride; said methallyl chloride and said aqueous solution forming an emulsion by virtue of the presence of an emulsifier and in a first stage at a temperature of between 30 and 70° C. and thereafter under reflux conditions, and cooling the reaction mixture thus obtained to a temperature of 0 to 15° C. and collecting the crystals precipitated.

2. The process according to claim 1, wherein said molar excess of methallyl chloride amounts to 5 to 30 mols percent.

3. The process according to claim 1, wherein said emulsifier is used in an amount of 0.2 to 3% by weight based on the quantity of methallyl chloride used.

4. The process of claim 3, said emulsifier used being selected from the group consisting of a long chain alkyl sulfonate, an alkylaryl sulfonate, a naphthalene sulfonate, a substituted naphthalene sulfonate, a fatty alcohol sulfate, and mixtures thereof.

References Cited

UNITED STATES PATENTS

| 3,453,320 | 7/1969 | Robeson | 260—513 B |
| 2,600,287 | 6/1952 | Wicklatz | 260—513 B |
| 1,888,794 | 11/1932 | Ernst et al. | 260—513 B |
| 2,797,239 | 6/1957 | Schramm et al. | 260—513 B |

FOREIGN PATENTS

| 63,480 | 9/1968 | Germany | 260—513 B |

OTHER REFERENCES

McCutcheon: Synthetic Detergents, p. 273 (1950), MacNair-Dorland Co., New York, N.Y., callnoTP990MZ.

Foster: Inorganic Chemistry for Colleges, pp. 279 and 283 (1936).

Gilbert: Sulfonation and Related Reactions, pp. 136 and 137 (1965).

DANIEL D. HORWITZ, Primary Examiner